Figure 1:
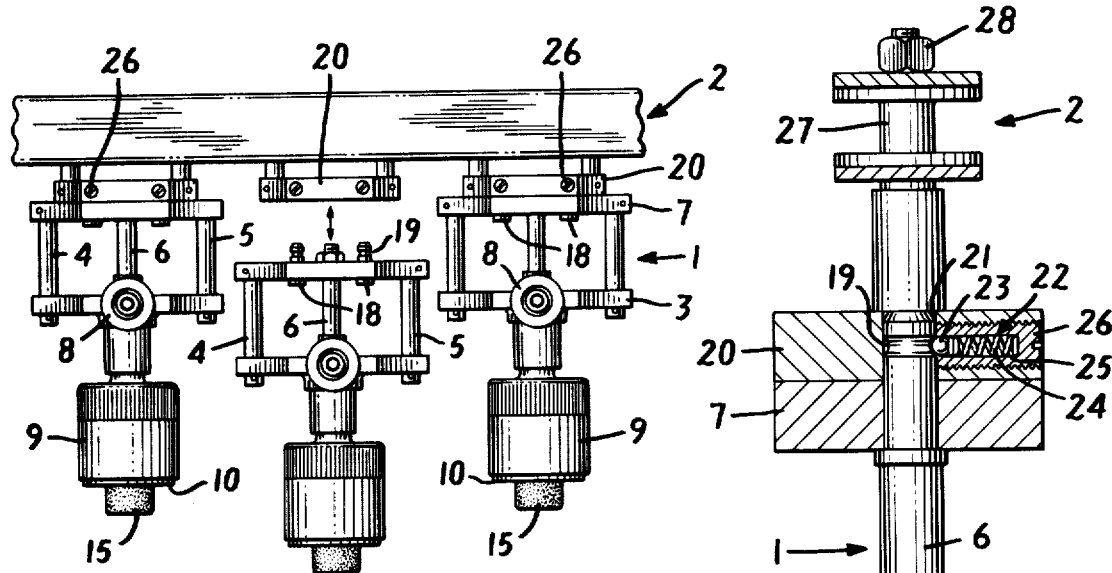

United States Patent
Frische

[11] 3,889,800
[45] June 17, 1975

[54] BOTTLE CHUCK HAVING A SNAP-ON SNAP-OFF COUPLING

[75] Inventor: Dale George Frische, Belleville, Ill.

[73] Assignee: Indian Head Inc., New York, N.Y.

[22] Filed: Jan. 10, 1974

[21] Appl. No.: 432,188

[52] U.S. Cl. .................................. 198/179; 85/5 B
[51] Int. Cl. ............................................ B65g 17/00
[58] Field of Search......... 198/179; 85/5 B; 403/328

[56] References Cited
UNITED STATES PATENTS
3,777,875  12/1973  Sobran........................... 198/179 X FOREIGN PATENTS OR APPLICATIONS
276,095  11/1951  Switzerland........................... 85/5 B

*Primary Examiner*—Evon C. Blunk
*Assistant Examiner*—Douglas D. Watts
*Attorney, Agent, or Firm*—Brumbaugh, Graves, Donohue and Raymond

[57] ABSTRACT

A vertically retractable rotatable bottle chuck attachable to a belt of an overhead chuck conveyor comprises a first support plate having at least one protruding lock pin with a recess in its exposed periphery and a second support plate having at least one mating orifice for receiving each aligned lock pin and release means intersecting each orifice for releasably engaging a lock pin recess, one of the plates supporting the bottle chuck and the other of the plates being attachable to the belt of the overhead chuck conveyor.

2 Claims, 3 Drawing Figures

PATENTED JUN 17 1975

3,889,800

SHEET 1

BOTTLE CHUCK HAVING A SNAP-ON SNAP-OFF COUPLING

The present invention relates to a vertically retractable rotatable bottle chuck having a snap-on snap-off coupling as an element thereof so as to render the chuck readily attachable and detachable to a belt of an overhead chuck conveyor.

In my copending U.S. application Ser. No. 404,304, filed Oct. 5, 1973, the disclosure of which is hereby incorporated by reference herein, there is disclosed a high speed bottle coating system and process which comprises among its elements an overhead chuck conveyor for rapid transporting of a file of suspended bottles through one or more spray coating stations having within the stations means for rotating or spinning the suspended bottles while they are being spray coated so as to insure a uniform coating therearound.

The overhead chuck conveyor comprises an endless chain belt having directly bolted thereto a plurality of vertically retractable rotatable bottle chucks. Each time a bottle chuck develops a malfunction resulting in the failure to grip securely a bottle by its finish, there will be consequent costly bottle breakage and uneconomical loss in throughput or bottle coating production. In view of the fact that the bottle chucks are directly bolted to the chain belt of the conveyor, the overhead chuck conveyor must be stopped along with the synchronized elements which would be affected by such shutdown, in order to replace the malfunctioning bottle chuck. Experience has shown that it takes approximately 15 minutes to unbolt a malfunctioning bottle chuck from the chain belt of the conveyor and to bolt a properly functioning bottle chuck as a replacement onto the chain belt. This downtime of about 15 minutes for a single file coating line operating at a coating speed of about 50 bottles per minute causes a loss in coating production of about 750 bottles which is uneconomical.

Accordingly, it is the principle object of the present invention to provide a vertically retractable rotatable bottle chuck having a snap-on snap-off coupling as an element thereof so as to render the chuck readily attachable and detachable to a belt of an overhead chuck conveyor and thereby eleminate the downtime in replacing a malfunctioning bottle chuck.

The vertically retractable rotatable bottle chuck of the invention comprises, in general, a first support plate having at least one protruding lock pin with a recess in its exposed periphery and a second support plate having at least one mating orifice for receiving each aligned lock pin and release means intersecting each orifice for releasably engaging a lock pin recess, one of the plates supporting the bottle chuck and the other of the plates being attachable to the belt of the overhead chuck conveyor. In the preferred embodiments of the bottle chuck of the invention the lock pin recess is a circumferential concavity and the release means is a protuberant spring-loaded ball, preferably a protuberant spring-loaded ball housed within a chamber of a set screw.

Figure 3:
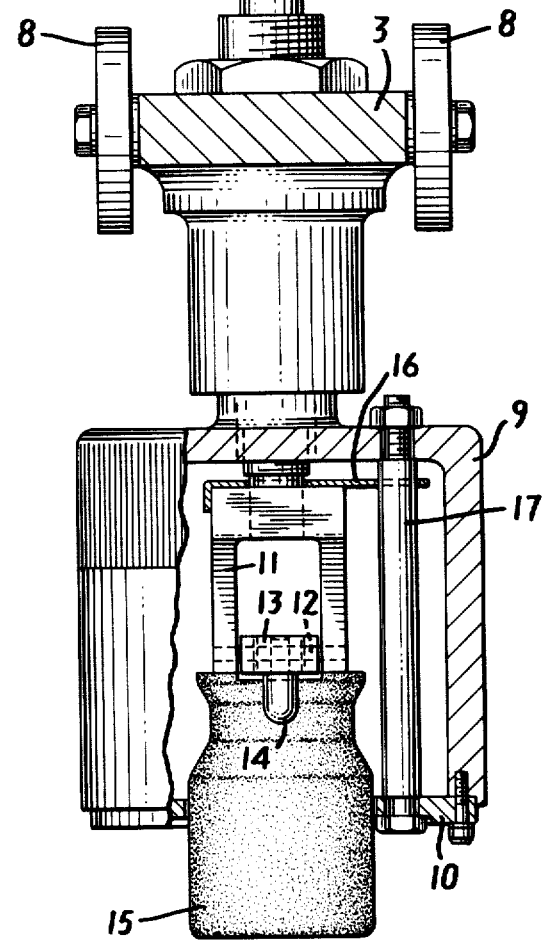
Figure 2:
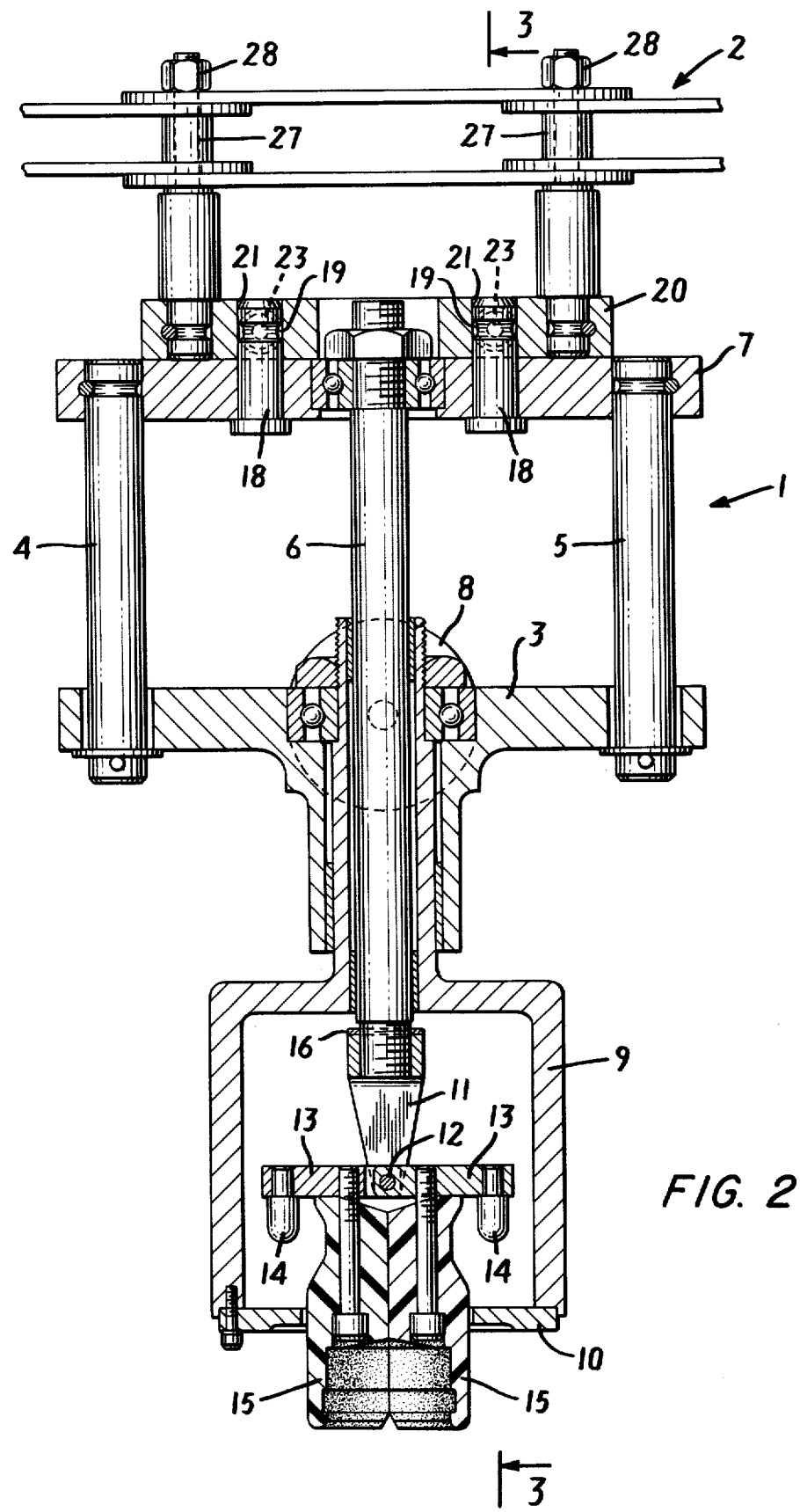

The invention will be more specifically described in connection with the accompanying drawings wherein:

FIG. 1 is a front elevational view of a plurality of the bottle chucks having the snap-on snap-off coupling, FIG. 2 is a front elevational view, partly in section, of the bottle chuck having the snap-on snap-off coupling, and FIG. 3 is an end elevational view, partly in section taken on line 3—3 of FIG. 2, of the bottle chuck having the snap-on snap-off coupling.

The invention is particularly directed to a bottle chuck 1 attachable to the chain belt of an overhead chuck conveyor 2. The bottle chuck 1 has a lower slide plate 3 which is vertically retractable and slidable along fixed shafts 4 and 5 and along rotatable shaft 6. Shafts 4 and 5 are suspended from a first support plate 7 while rotatable shaft 6 is seated within a journal on the first support plate 7. Mounted on the slide plate 3 are two opposed rollers 8. Seated on the slide plate 3 is a rotatable chuck collar 9 having an annular bottom cover 10.

The rotatable shaft 6 has threaded on the lower end thereof a sling 11 with a hinge pin 12 between the ends thereof. Pivotally mounted upon the hinge pin 12 are two hinges 13 each having buttons 14 on the lower face thereof and each having affixed thereto hemicylindrical chuck fingers 15 which extend through the opening in the annular bottom cover 10. The sling 11 is locked to the rotatable chuck collar 9 by a gripping finger 16 connected to a bolt 17 passing through the top of the chuck collar 9 and the bottom cover 10.

In operation, the bottle chuck 1 carried by the overhead chuck conveyor 2 passes to a bottle loading station and ultimately to a bottle unloading station, each of which stations has upwardly inclined and then downwardly inclined fingers. The opposed rollers 8 mounted on the vertically retractable slide plate 3 of the bottle chuck 1 upon ascending the upwardly inclined fingers retract upwardly the slide plate 3 and the rotatable chuck collar 9 seated thereon along the shafts 4, 5 and 6. Upon upward movement of the slide plate 3 and the chuck collar 9, the annular bottom cover 10 of the rotatable chuck collar 9 strikes the buttons 14 of the hinges 13 which pivot upwardly about hinge pin 12 of the sling 11 threaded onto the base of the rotatable shaft 6 and open the chuck fingers 15. As the rollers 8 descend along the downwardly inclined fingers at the bottle loading station or bottle unloading station the slide plate 3 and the chuck collar 9 seated thereon move downwardly along the support shafts 4, 5 and 6 and disengage the annular bottom cover 10 of the rotatable chuck collar 9 from the buttons 14 and permit the hinges 13 to pivot downwardly about the hinge pin 12 and thereby close the chuck fingers 15, for example, about the finish or neck of a bottle (not shown) to be suspended therefrom at a bottle loading station.

Rotation of the rotatable chuck collar 9 by frictional engagement with a drive belt of a bottle spinner assembly (not shown) causes rotation of any bottle suspended by its finish from the chuck fingers 15, since the rotatable chuck collar 9 is locked via bolt 17 and gripping finger 16 to the sling 11 threaded onto the lower end of the rotatable support shaft 6.

the first support plate 7 carrying fixed support shafts 4 and 5 and rotatable shaft 6 has protruding upwardly therethrough two lock pins 18 having a circumferential concavity or recess 19 in the exposed periphery. The lock pins 18 are press fitted through holes within the first support plate 7.

Above the first support plate 7 there is a second support plate 20 having mating orifices 21 for receiving each of the aligned lock pins 18. A release means 22 intersects each of the orifices 21 for releasably engaging the recess 19 of the lock pin 18. The release means 22 is a protuberant ball 23 loaded by a spring 24. The protuberant spring-loaded ball 23 and the spring 24 are within a chamber 25 of a set screw 26. The ball 23 protrudes outwardly from the open end of the chamber 25 of the set screw and is held within the chamber 25 of the set screw 26 by crimping the open end of the chamber 25 so as to permit less than a hemispherical portion of the ball 23 to protrude. Adjustment of the retention pressure applied by the spring-loaded ball 23 of the set screw 26 to the circumferential concavity or recess 19 in the locking pin 18 is achieved by screwing the set screw 26 inwardly or outwardly, as needed.

Extending upwardly from the second support plate 20 are two threaded bolts 27 having nuts 28 for permanently attaching the second support plate 20 to the chain belt of the overhead chuck conveyor 2. A malfunctioning bottle chuck 1 is readily and rapidly detachable from the overhead chuck conveyor 2 by merely hand gripping the bottle chuck 1 and applying a downward force so as to disengage the spring-loaded ball 23 of the release means 22 in the second support plate 20 from the circular concavity or recess 19 of the lock pin 18 protruding from the first support plate 7. Conversely, a properly functioning bottle chuck 1 can be readily and rapidly inserted in place of a removed malfunctioning bottle chuck 1 by sliding the lock pins 18 of the first support plate 7 upwardly into the aligned mating orifices 21 of the second support plate 20 so as to fit the spring-loaded ball 23 into gripping engagement with the circular concavity or recess 19 of the lock pin 18. Both the removal and replacement of a bottle chuck 1 of the invention upon an overhead chuck conveyor 2 can be done within a very small time period of 4 to 6 seconds and accordingly the invention eliminates the downtime and loss in bottle coating production.

In other embodiments of the invention, the two lock pins 18 of the first support plate 7 and the two aligned mating orifices 21 and release means 22 of the second support plate 20 can be transposed with one another. Moreover, one, two or more of the lock pins 19 and the complimentary mating orifices 21 and release means 22 can be used. In addition, the lock pins 18 can be made integral with either the first support plate 7 or the second support plate 20. It is preferred that the lock pin 18 have a circumferential concavity or recess 19 so that there is no need to prealign the concavity 19 of the lock pin 18 into registration with the spring-loaded ball 23 as is the case where the concavity or recess 19 in the lock pin 18 is a mere hemispherical recess or dimple. Furthermore, the spring-loaded ball 23 can be housed directly in either the first support plate 7 or the second support plate 20 by having the spring-loaded ball 23 fitted directly into a chamber within the support plate 7 or 20 rather than into the chamber 25 of the set screw 26. Such an arrangement, however, does not permit the ready adjustment of the retention pressure applied by the ball 23 to the concavity or recess 19 in the lock pin 18. The spring-loaded ball 23 can be replaced by a spring-loaded pin or rod.

It will be appreciated that various other modifications and changes in addition to those mentioned above may be made by those skilled in the art without departing from the essence of the invention and accordingly the invention is to be limited only within the scope of the appended claims.

What is claimed is:

1. In a vertically retractable rotatable bottle chuck attachable to a belt of an overhead chuck conveyor, the improvement which comprises a first support plate having at least one protruding lock pin and a recesss in its exposed periphery and a second support plate having at least one mating orifice for receiving each aligned lock pin and release means intersecting each orifice for releasably engaging a lock pin recess, one of the plates supporting the bottle chuck and the other of the plates being attachable to the belt of the overhead chuck conveyor; said release means being a protuberant spring-loaded ball housed within a chamber of a set screw.

2. The bottle chuck as defined in claim 1 wherein the lock pin recess is a circumferential concavity.

* * * * *

UNITED STATES PATENT OFFICE
CERTIFICATE OF CORRECTION

PATENT NO. : 3,889,800
DATED : June 17, 1975
INVENTOR(S) : DALE GEORGE FRISCHE

It is certified that error appears in the above—identified patent and that said Letters Patent are hereby corrected as shown below:

Col. 2, line 59, "the" should be -- The --. Col. 3, line 7, after "set screw" insert -- 26 --. Col. 4, line 1, "lock pins 19" should be -- lock pins 18 --; line 31, "and a recesss" should be -- with a recess --; line 40, "in claim 1" should be -- by claim 1 --.

Signed and Sealed this second Day of September 1975

[SEAL]

Attest:

RUTH C. MASON
Attesting Officer

C. MARSHALL DANN
Commissioner of Patents and Trademarks